(12) United States Patent
Penninckx et al.

(10) Patent No.: US 8,483,321 B2
(45) Date of Patent: Jul. 9, 2013

(54) METHOD FOR SPREADING THE SPECTRUM OF A NARROWBAND SIGNAL

(75) Inventors: Denis Penninckx, Cestas (FR); Steve Hocquet, Talence (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 195 days.

(21) Appl. No.: 13/119,462

(22) PCT Filed: Sep. 23, 2009

(86) PCT No.: PCT/EP2009/062342
§ 371 (c)(1),
(2), (4) Date: Mar. 17, 2011

(87) PCT Pub. No.: WO2010/034753
PCT Pub. Date: Apr. 1, 2010

(65) Prior Publication Data
US 2011/0164658 A1   Jul. 7, 2011

(30) Foreign Application Priority Data

Sep. 26, 2008 (FR) ..................................... 08 56475

(51) Int. Cl.
*H03D 3/22* (2006.01)
(52) U.S. Cl.
USPC ........... 375/332; 375/130; 375/260; 398/182; 398/147

(58) Field of Classification Search
USPC .................. 375/130, 332; 455/110; 704/500
See application file for complete search history.

(56) References Cited

U.S. PATENT DOCUMENTS

| 5,566,381 | A | 10/1996 | Korotky |
| 6,282,003 | B1 | 8/2001 | Logan, Jr. et al. |
| 6,535,315 | B1 | 3/2003 | Way et al. |
| 8,023,830 | B2 * | 9/2011 | Iannelli ........................ 398/182 |
| 2002/0015208 | A1 | 2/2002 | Logan, Jr. et al. |
| 2004/0091066 | A1 * | 5/2004 | Noe ............................... 375/332 |
| 2007/0140704 | A1 | 6/2007 | Mauro et al. |
| 2011/0124301 | A1 * | 5/2011 | Prasidh et al. ................. 455/110 |

FOREIGN PATENT DOCUMENTS

EP  0 730 190 A2  9/1996

OTHER PUBLICATIONS

International Search Report issued Nov. 4, 2009, in Patent Application No. PCT/EP2009/062342.

* cited by examiner

*Primary Examiner* — Eva Puente
(74) *Attorney, Agent, or Firm* — Oblon, Spivak, McClelland, Maier & Neustadt, L.L.P.

(57) ABSTRACT

A method for spreading a spectrum of a narrowband signal, e.g. a monochromatic optical signal or a radiofrequency carrier. The method uses a phase modulation using a modulation signal that includes a plurality of sinusoidal components, the plurality including a component at a fundamental frequency and at least one component at a frequency that is a harmonic of the fundamental frequency, the sinusoidal components being synchronous and affected with phases respectively equal to consecutive multiples of $\pi/2$.

16 Claims, 6 Drawing Sheets

METHOD FOR SPREADING THE SPECTRUM OF A NARROWBAND SIGNAL

TECHNICAL FIELD

The present invention generally relates to a method for spreading a spectrum. It notably finds application in the suppression of stimulated Brillouin scattering in optical fibers and high power laser systems. It may also be applied to multifrequency telecommunications systems.

STATE OF THE PRIOR ART

Brillouin scattering is a well-known phenomenon in optics which may be interpreted from a quantum point of view as an inelastic interaction between a photon and a phonon. When an optical wave undergoes Brillouin scattering, the scattered wave comprises a first component shifted towards low frequencies, a so-called Stokes wave and a second component, shifted towards high frequencies a so-called anti-Stokes wave. This is then spontaneous Brillouin scattering.

When the optical power density is high, for example for high power laser beams or laser beams propagating in confined media such as optical fibers, the electromagnetic field may induce acoustic vibrations in the propagation medium. The scattering of photons by the phonons thus generated leads to an amplification of the Stokes wave, a phenomenon known as stimulated Brillouin scattering. The Stokes wave is backscattered i.e. it propagates in a direction opposite to that of the incident wave. Therefore, it may damage the optical source or considerably reduce the transmitted optical power. It may also propagate perpendicularly to the incident wave which may damage large size optics.

The effect of stimulated Brillouin scattering also designated by SBS is all the more significant since the spectral width of the beam is larger. It is known how to widen the spectrum of the optical source by means of frequency modulation or phase modulation, a so-called anti-Brillouin modulation in order to combat the SBS effect. Phase modulation of a wave is mathematically expressed as a multiplication by a term $e^{j\phi(t)}$ and, in the case when phase modulation is sinusoidal:

$$\phi(t) = m \sin(2\pi f_m t) \quad (1)$$

wherein m and $f_m$ are the depth and the frequency of the phase modulation, respectively.

In spectral space, sinusoidal phase modulation is therefore expressed by a convolution with a Dirac comb:

$$P(f) = \sum_{k=-\infty}^{k=+\infty} J_k(m) \delta(f - k f_m) \quad (2)$$

wherein $J_k(.)$ is the Bessel function of the first kind of order k and $\delta(.)$ is the Dirac distribution. Thus, for a monochromatic source, the spectrum of the modulated signal consists of an infinity of lines spaced out by $f_m$ and symmetrically positioned relatively to the frequency of the source. However, it may be shown (Carson's rule) that 98% of the energy of the modulated signal is found in a spectral band of width $2(m+1)f_m$ around the frequency of the source. It is therefore understood that the more the modulation depth m is increased, the wider will be the spreading of the spectrum.

The spectral power density of the modulated signal may however have strong variations in the relevant band. In particular, certain lines located close to the carrier are of very low intensity or even of zero intensity since they correspond to the zeroes of the Bessel function. Now, in order to obtain an effective reduction in the SBS effect, without unduly spreading the spectrum, a spreading of the spectrum has to be obtained as homogeneous as possible. In other words, for a given incident wave power and a given spectral band, better reduction in the SBS effect will be obtained if the distribution of the spectral density of the modulated signal is uniform in this band. Alternatively, with a given backscattering level, the band of the modulated signal will be narrower when the distribution of the spectral density will be more uniform.

Document U.S. Pat. No. 5,566,381 describes a phase modulation method aiming at obtaining a relatively uniform spread spectrum. This phase modulation involves a plurality of cascaded phase modulators with different modulation depths and different modulation frequencies, as illustrated in FIG. 1. More specifically, the optical beam generated by the laser 110 is successively modulated by the phase modulators $120_1$ to $120_N$, each modulator $120_i$ being controlled by a frequency signal $f_i$, generated by the oscillator $150_i$ and amplified by the amplifier $135_i$ of gain $m_i$. The global phase modulation may be expressed as $e^{j\phi(t)}$ with:

$$\varphi(t) = \sum_{i=1}^{N} m_i \sin(2\pi f_{m_i} t) \quad (3)$$

However, the proposed modulation does not, as a general rule, give good results. The mentioned example with N=2, $f_2=f_1/3$, $m_1=m_2=0.457\pi$ notably does not give the possibility of obtaining the announced result of a flat spectrum over 9 lines on either side of the carrier.

Document U.S. Pat. No. 6,282,003 repeats the preceding phase modulation example i.e. a modulated phase of the form:

$$\phi(t) = m_1 \sin(2\pi f_1 t) + m_2 \sin(2\pi f_2 t) \quad (4)$$

with $f_2=3f_1$, and proposes searching for values of modulation depths $m_1$ and $m_2$ which both correspond to a uniform spectrum and to an operating point not very sensitive to changes in the modulation depths. However, as in the previous case, the intensity variations of the spectral lines around the carrier, i.e. at frequencies $f_0+nf_1$ wherein $f_0$ is the frequency of the carrier and n is a relative integer comprised between −10 and +10, are significant. More specifically, the intensity of a spectral line distant by $nf_1$ from the carrier frequency is given by:

$$I_n = \sum_{k=-\infty}^{+\infty} J_{n-3k}^2(m_1) J_k^2(m_2) \quad (5)$$

It is seen that $I_n$ varies as a function of n, notably when $m_1$ is not negligible relatively to 1, and when the spreading of the spectrum is therefore not always uniform.

In another technical field, i.e. that of telecommunications of the multi-frequency type, for example for optical WDM (Wavelength Division Multiplexing) telecommunications systems or further for FDM (Frequency Division Multiplex) telecommunications systems, it is sometimes useful to have available a comb of frequencies. This comb may be generated as this was seen above by carrying out sinusoidal modulation of the phase of a carrier. It is generally important that the amplitudes of the different carriers be substantially equal, for example in order to guarantee similar propagation conditions, to optimize amplification etc.

The object of the present invention is therefore to propose a method for spreading a spectrum by phase modulation with which a more uniform spectral density may be obtained than in the state of the art.

DISCUSSION OF THE INVENTION

The present invention relates to a method for spreading the spectrum of a narrow band signal, wherein said signal is phase-modulated with a phase modulation signal consisting of a plurality of sinusoidal components, said plurality comprising one component at a fundamental frequency and at least one component at a harmonic frequency of this frequency, said sinusoidal component being synchronous and having phases respectively equal to successive multiples of $\pi/2$.

According to a first alternative, the modulation signal consists of the component at the fundamental frequency and of a component at a frequency which is twice this frequency, the component at the fundamental frequency being of an amplitude substantially equal to 1.2 and the component at the double frequency being of an amplitude substantially equal to 5.9, the phase of the component of double frequency being shifted by $\pm\pi/2$ relatively to that of the component at the fundamental frequency.

According to a second alternative, the modulation signal consists of the component at the fundamental frequency and of a component at a frequency which is thrice this frequency, both components being of the same amplitude substantially equal to $0.45\pi$, the phase of the component at the triple frequency being shifted by $\pm\pi/2$ relatively to that of the component at the fundamental frequency.

According to a third alternative, the modulation signal consists of the component at the fundamental frequency, of a component at the double frequency and of a component at a frequency which is thrice this frequency, the amplitude of the component at the fundamental frequency being substantially equal to 1.4, the amplitude of the component at the double frequency being comprised between 2 and 20 and the amplitude of the component at the triple frequency being substantially equal to 0.4, the phases of the components at the double and triple frequency being shifted by $\pm\pi/2$ and $\pi$ respectively, relatively to that of the fundamental component.

In every case, the narrowband signal may be an optical wave or a radio frequency carrier.

The modulation of the narrowband signal may be carried out by means of successive modulation of this signal by the different sinusoidal components of the modulation signal.

SHORT DESCRIPTION OF THE DRAWINGS

Other features and advantages of the invention will become apparent upon reading a preferential embodiment of the invention made with reference to the appended figures wherein.

DETAILED DISCUSSION OF PARTICULAR EMBODIMENTS

We shall generally consider a method for spreading the spectrum of a narrowband signal, either an optical or radiofrequency signal, by means of phase modulation.

As an illustration, we shall assume the particular case of a monochromatic signal or a carrier signal which may be represented as $E_0 e^{j\omega_0 t}$ undergoing phase modulation defined by:

$$\varphi(t) = \sum_{i=1}^{N} m_i \sin(\omega_i t + \varphi_i) \quad (6)$$

wherein the $\omega_i = 2\pi f_i$ are multiple angular frequencies of a fundamental modulation frequency $\Omega = 2\pi f$; $m_i$ and $\phi_i$ are the respective modulation depths and phases of the different harmonic components of the phase modulation. Taking into account the previous notations, the modulated signal is then of course expressed as $E_0 e^{j(\omega_0 t + \phi(t))}$.

It is important to note that the phase modulation signal defined by (6) comprises a plurality of sinusoidal components of frequencies $\omega_i$, the phases $\phi_i$ of which at the origin may be arbitrarily selected.

The invention is based on a wise selection of phases $\phi_i$ leading to substantial improvement in the uniformity of the spectral density. In the following, the deviation from the spectral uniformity will be measured, i.e. the deviation from the flatness of the spectrum, by the ratio between the standard deviation of the spectral density in the band of the modulated signal and its average value. By band of the modulated signal is meant here the spectral band containing 950 of the power of the signal. If $\mu_k$ designates the intensity of the spectral lines in this band and $\bar{\mu}$ their average, the deviation from the spectral uniformity in this band will not be other than $$\sigma / \bar{\mu} = \sqrt{\sum_k (\mu_k / \bar{\mu} - 1)^2}.$$

Firstly, phase modulation will be considered with two sinusoidal components, such that:

$$\phi(t) = m_1 \sin \Omega t + m_2 \sin(2\Omega t + \phi_2) \quad (7)$$

where conventionally $\phi_1 = 0$ has been assumed at the origin. For any given pair $m_1, m_2$ of modulation depths, the minimum deviation from the spectral uniformity is obtained for $\phi_2 = \pm\pi/2$. Although this result is difficult to demonstrate mathematically, it was able to be observed by simulation in a large number of cases.

Figure 3:
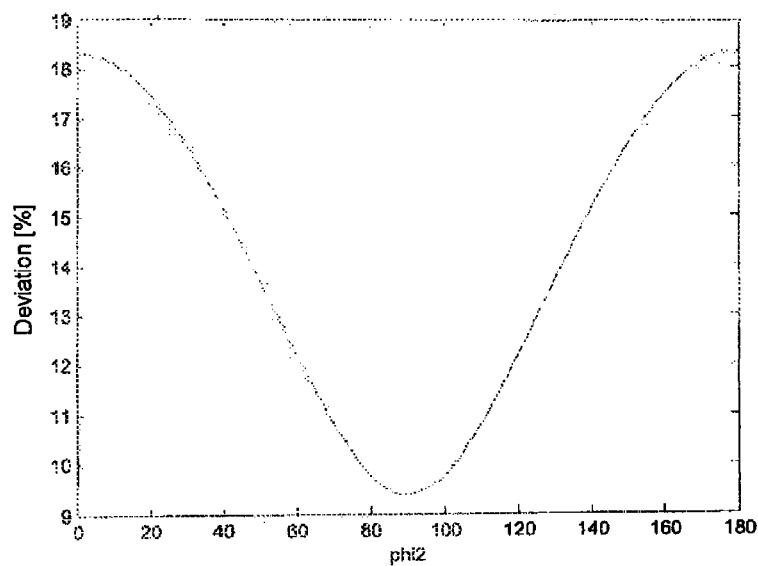
FIG. 3 illustrates the deviation from spectral uniformity of a first exemplary phase modulated signal.

As an example, FIG. 3 illustrates the deviation from the spectral uniformity of the signal phase-modulated by the modulation signal (7) versus the phase $\phi_2$. The deviation is indicated as a percentage and the phase is indicated in degrees. The values of the modulation depths were selected so that $m_1=1.2$, $m_2=5.9$ and the retained spectral band was $[-25f+f_0,f_0+25f]$. It is seen, as announced, that the minimum deviation is reached for $\phi_2=\pi/2$.

Figure 4:
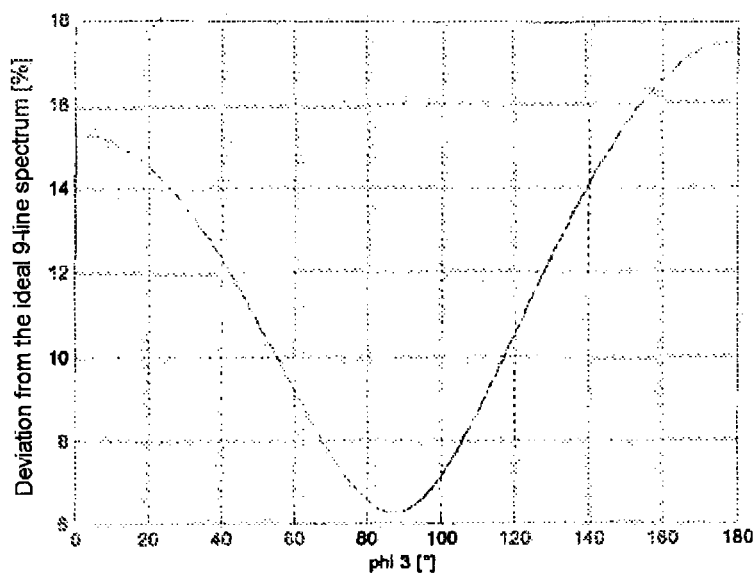
FIG. 4 illustrates the deviation from spectral uniformity of a second exemplary phase modulated signal.

Similarly, if one starts with the phase modulation example given in the prior art, i.e. $\phi(t)=m_1 \sin \Omega t+m_3 \sin 3\Omega t$, with $m_1=m_3=0.457\pi$ and if a phase shift is now introduced between the sinusoidal components according to (6) i.e.:

$$\phi(t)=m_1 \sin \Omega t+m_2 \sin(3\Omega t+\phi_3) \quad (8)$$

it is seen that the deviation from spectral uniformity attains a minimum when $\phi_3=\pm\pi/2$. FIG. 4 illustrates the deviation from the spectral uniformity of the modulated signal, expressed as a percentage, versus the phase $\phi_3$, expressed in degrees.

Figure 1:
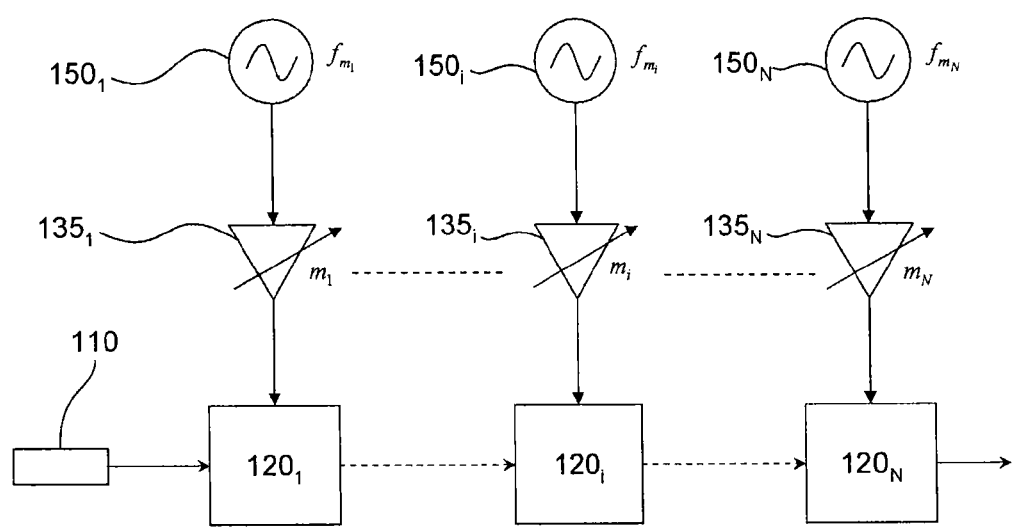
FIG. 1 illustrates a device for spreading a spectrum by phase modulation known from the state of the art.
Figure 2A:
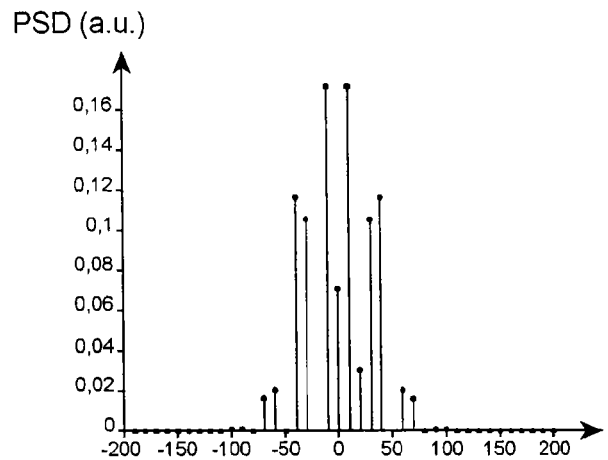
FIG. 2A illustrates a spread spectrum obtained by means of the device of FIG. 1.
Figure 2B:
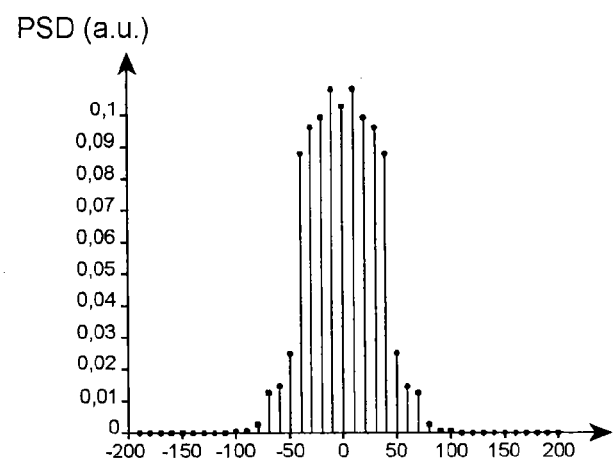
FIGS. 2B and 2C illustrate spread spectra obtained by the spectrum spreading method according to the invention.

A phase modulation signal with two sinusoidal components is sufficient for obtaining a quasi-flat spectrum (deviation from uniformity of less than 10%) in a spectral band $[-9f+f_0,f_0+9f]$ as illustrated in FIG. 2B. For more significant spreading of the spectrum, an additional sinusoidal component should be added to a new harmonic, for example:

$$\phi(t)=m_1 \sin \Omega t+m_2 \sin(2\Omega t+\phi_2)+m_3 \sin(3\Omega t+\phi_3) \quad (9)$$

the minimum deviation from the spectral uniformity being obtained for phase values $\phi_2=\pm\pi/2$ and $\phi_3=\pi$. Advantageously, the modulation depths will be selected such as $m_1=1.4$, $2\leq m_2\leq 20$ and $m_3=0.4$.

Figure 2C:
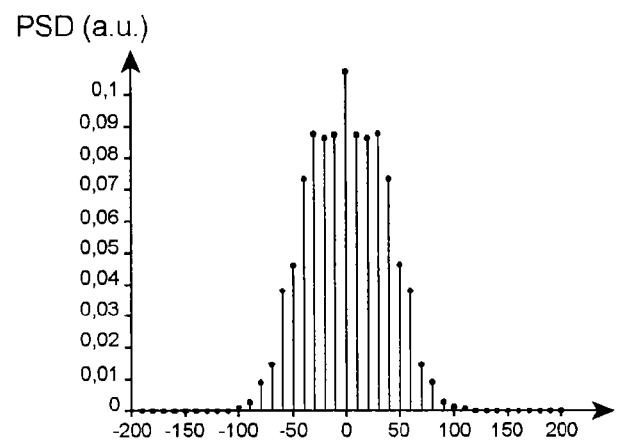

FIG. 2C shows as an example the spectrum of the modulated signal for $m_2=2.4$, the spectral band is of 11 lines on either side of the central frequency and the deviation relatively to uniformity is less than 10%. If the modulation depth $m_2$ is increased up to 20, the spectrum gradually widens while observing a deviation relatively to uniformity of less than 10%.

Figure 5:
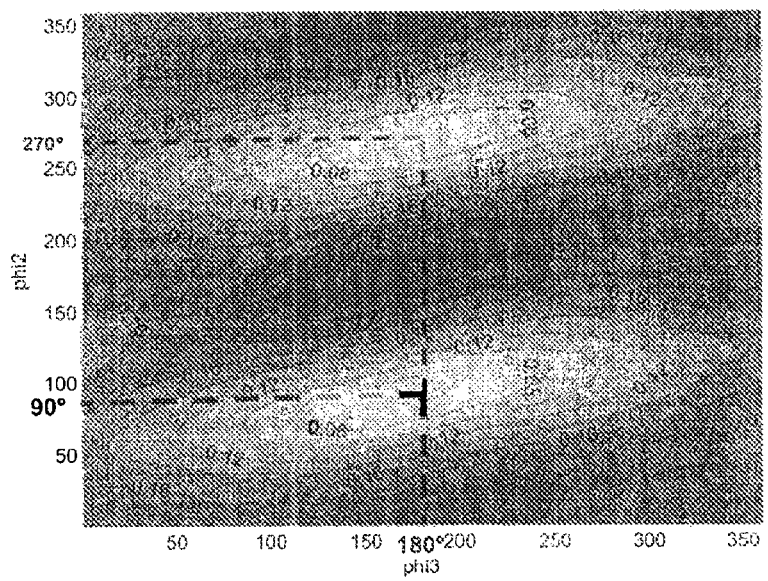
FIG. 5 illustrates iso-deviation level curves relatively to the spectral uniformity of a third exemplary phase-modulated signal.

FIG. 5 illustrates the iso-deviation curves relatively to the spectral uniformity of a signal phase modulated by the modulation signal (9) with $m_1=1.4$, $m_2=5.6$ and $m_3=0.4$, versus the values of the phases $\phi_2$ and $\phi_3$, expressed in degrees. For each iso-deviation curve, the value of the corresponding deviation within the spectral band $[-25f+f_0,f_0+25f]$ is indicated. It is seen, as announced, that the minimum is obtained for $\phi_3=\pi$ and $\phi_2=\pm\pi/2$, the deviation from uniformity is less than 6%.

The previous phase modulation gives good results in the band $[-25f+f_0,f_0+25f]$. For spreading of the spectrum beyond this band, the fourth harmonic should be introduced, i.e.:

$$\phi(t)=m_1 \sin \omega t+m_2 \sin(2\Omega t+\phi_2)+m_3 \sin(3\Omega t+\phi_3)+m_4 \sin(4\Omega t+\phi_4) \quad (10)$$

the minimum deviation from the spectral uniformity being attained for $\phi_2=\pi/2$, $\phi_3=\pi$, $\phi_4=3\pi/2$ and for $\phi_2=-\pi/2$, $\phi_3=-\pi$, $\phi_4=-3\pi/2$.

Figure 6:
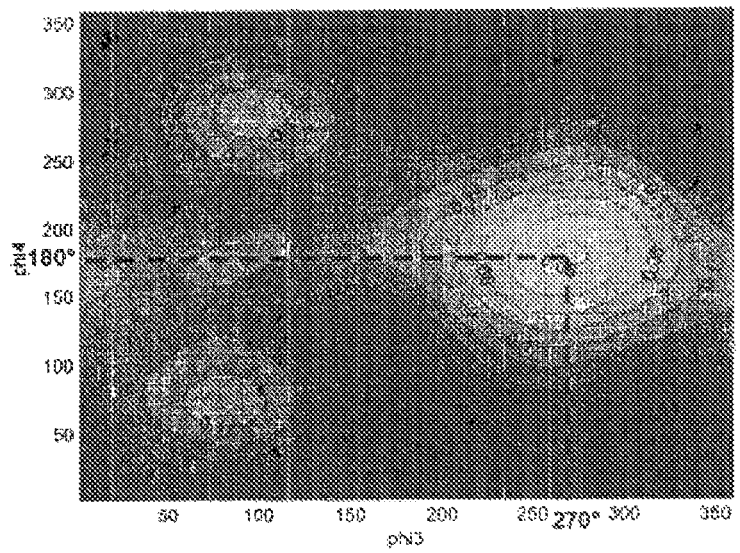
FIG. 6 illustrates iso-deviation level curves relatively to the spectral uniformity of a fourth exemplary phase modulated signal.

FIG. 6 illustrates the iso-deviation curves relatively to the spectral uniformity of a signal phase-modulated by the modulation signal (10) with $m_1=1.2$, $m_2=6.8$, $m_3=0.4$, $m_4=0.6$ and $\phi_2=\pi/2$, versus the values of the phases $\phi_3$ and $\phi_4$, expressed in degrees for each iso-deviation curve, the value of the corresponding deviation within the spectral band $[-31f+f_0,f_0+31f]$ is indicated. There again, it is seen that the minimum deviation of less than 6% is obtained for $\phi_3=\pi$ and $\phi_4=\pi/2$. Also, if $\phi_2=-\pi/2$ had been set, it would have been shown that this minimum deviation was obtained for $\phi_3=\pi$ and $\phi_4=\pi/2$.

Generally, it is seen that if a phase modulation signal is used as defined by (6), the deviation from the spectral uniformity is minimum when the phases of the different sinusoidal components of the phase modulation signal are distributed over successive multiple integers of $\pi/2$. If the fundamental component is taken as a reference, the non-zero harmonic components will then be modified with the phase shifts $$0, \frac{\pi}{2}, \pi, \frac{3\pi}{2}, \ldots, (N-1)\frac{\pi}{2}$$

if the distribution order follows the trigonometric (anticlockwise) direction or else with the phase shifts $$0, -\frac{\pi}{2}, -\pi, -\frac{3\pi}{2}, \ldots, -(N-1)\frac{\pi}{2}$$

if this order follows the reverse direction.

In every case, it will be noted that the higher the number N of harmonics, the greater is the spreading of the spectrum of the signal.

It is sometimes advantageous to set, in addition to the phase values $\phi_i$ (at successive integer multiples of $\pi/2$), the values of the modulation depths $m_i$ except for one of them noted as $m_{i0}$. A parameterizable spectral shape is then obtained with 1 degree of freedom. For example, in the case of phase modulation with three sinusoidal components given by the expression (9), the modulation depth $m_2$ allows parameterization of the shape of the spectrum while varying between 2 and 20.

When the phase values $\phi_i$ assume the aforementioned values, the spectrum is not only flat but also symmetrical around the carrier frequency. This is advantageous insofar that the carrier frequency $\omega_0$ remains the central frequency.

This symmetry property may be shown for phase modulation with two sinusoidal components. Indeed, a wave $E_0 e^{j\omega_0 t}$ phase-modulated by the signal (7) may be written as the product:

$$E_0 e^{j\omega_0 t} \cdot e^{jm_1 \sin \Omega t} \cdot e^{jm_2 \sin(2\Omega t+\phi_2)} \quad (11)$$

Its spectrum is therefore of the form $P(\omega)=p(\omega+\omega_0)$ wherein $p(\omega)$ is the convolution of the spectra of the last two terms of (11):

$$p(\omega) = \sum_\ell J_\ell(m_1)\delta(\omega-\ell\Omega) \otimes \sum_k J_k(m_2)e^{jk\varphi_2}\delta(\omega-2k\Omega) \quad (12)$$

i.e.:

$$p(\omega) = \sum_\ell \left(\sum_k J_{\ell-2k}(m_1)J_k(m_2)e^{jk\varphi_2}\right)\delta(\omega-\ell\Omega) \quad (13)$$

The spectrum of the phase-modulated signal is therefore a spectrum of lines spaced apart by $\Omega$. The intensity of the line in $-n\Omega$ is given by $|p(-n\Omega)|^2$:

$$p(-n\Omega) = \sum_k J_{-n-2k}(m_1)J_k(m_2)e^{jk\varphi_2} \quad (14)$$

which may further be written as:

$$p(-n\Omega) = \sum_k J_{-n+2k}(m_1) J_{-k}(m_2) e^{-jk\varphi_2} \quad (15)$$

and taking into account that $J_{-l}(m)=(-1)^l J_l(m)$:

$$p(-n\Omega) = (-1)^n \sum_k J_{n-2k}(m_1) J_k(m_2)(-1)^k e^{-jk\varphi_2} \quad (16)$$

Now, given that for $\phi_2 = \pm\pi/2$, $e^{-jk\phi_2} = (-1)^k e^{jk\phi_2}$:

$$p(-n\Omega) = (-1)^n p(n\Omega) \quad (17)$$

The spectral density $|p(\omega)|^2$ is therefore symmetrical.

This result is generalized without any great difficulty to the case when the phase modulation signal consists of a plurality N of sinusoidal components having phases $\phi_i$ equal to values of successive integer multiples of $\pi/2$.

Figure 7A:
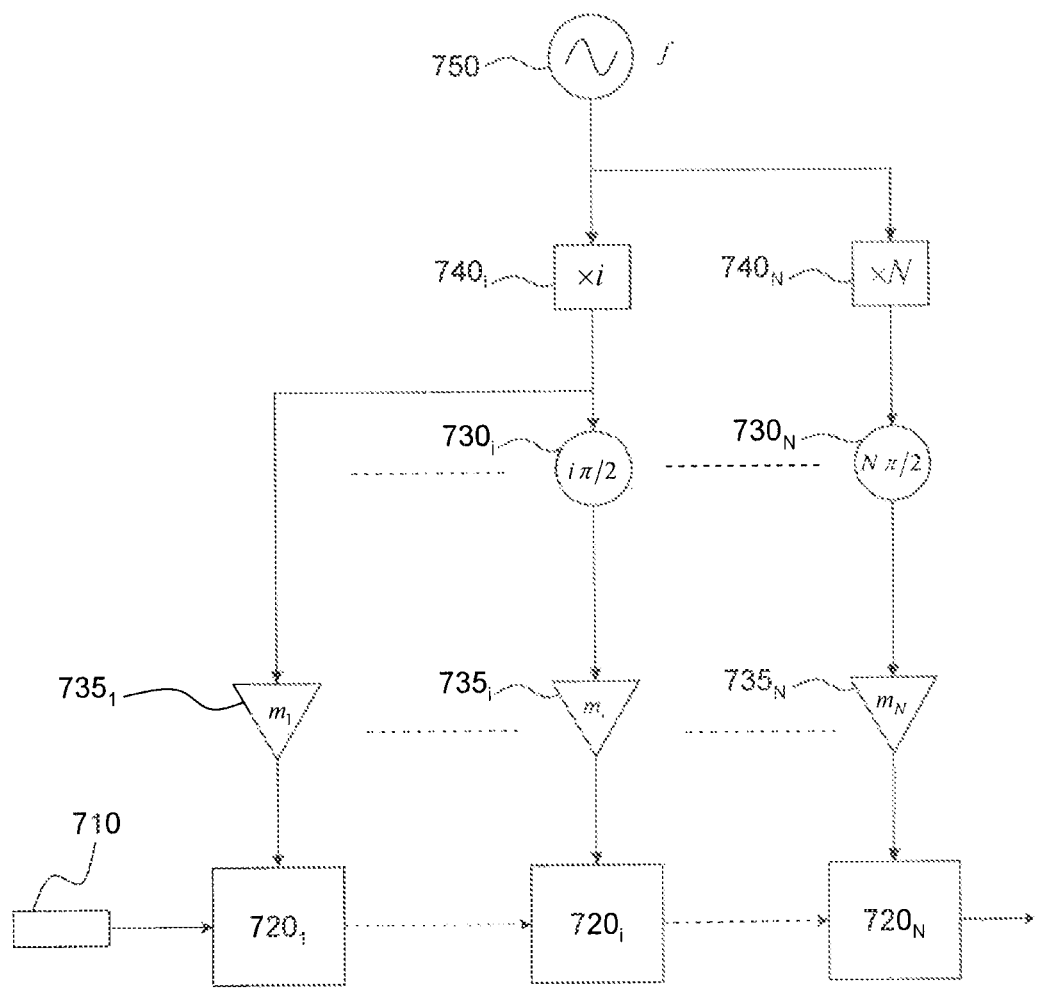
FIG. 7A illustrates a first example of a phase modulation device applying the method for spreading a spectrum according to the invention.

FIG. 7A shows a first exemplary embodiment of a phase modulator applying the method for spreading a spectrum according to the invention.

The laser beam emitted by the laser source 710 is successively modulated by a plurality of phase modulators $720_1$ to $720_N$ arranged as a cascade. The oscillator 750 generates a sinusoidal signal of fundamental frequency $f=\Omega/2\pi$. This signal is provided to frequency multipliers $740_2, \ldots, 740_N$ in order to generate sinusoidal signals having frequencies which are multiples of the fundamental frequency. The generated signals are synchronous with the fundamental signal and all have the same phase at the origin. These signals are then phase-shifted in phase shifters $730_2, \ldots, 730_N$. The introduced phase shifts correspond to successive integer multiples of $\pi/2$. Strictly speaking, these phase shifts should be corrected in order to take into account the propagation time between the modulators $720_1$ to $720_N$. The fundamental signal and the phase shifted harmonic signals are then amplified by the amplifiers $735_1, \ldots, 735_N$ with respective gains $m_1, \ldots, m_N$ before controlling the phase modulators $720_1$ to $720_N$.

Figure 7B:
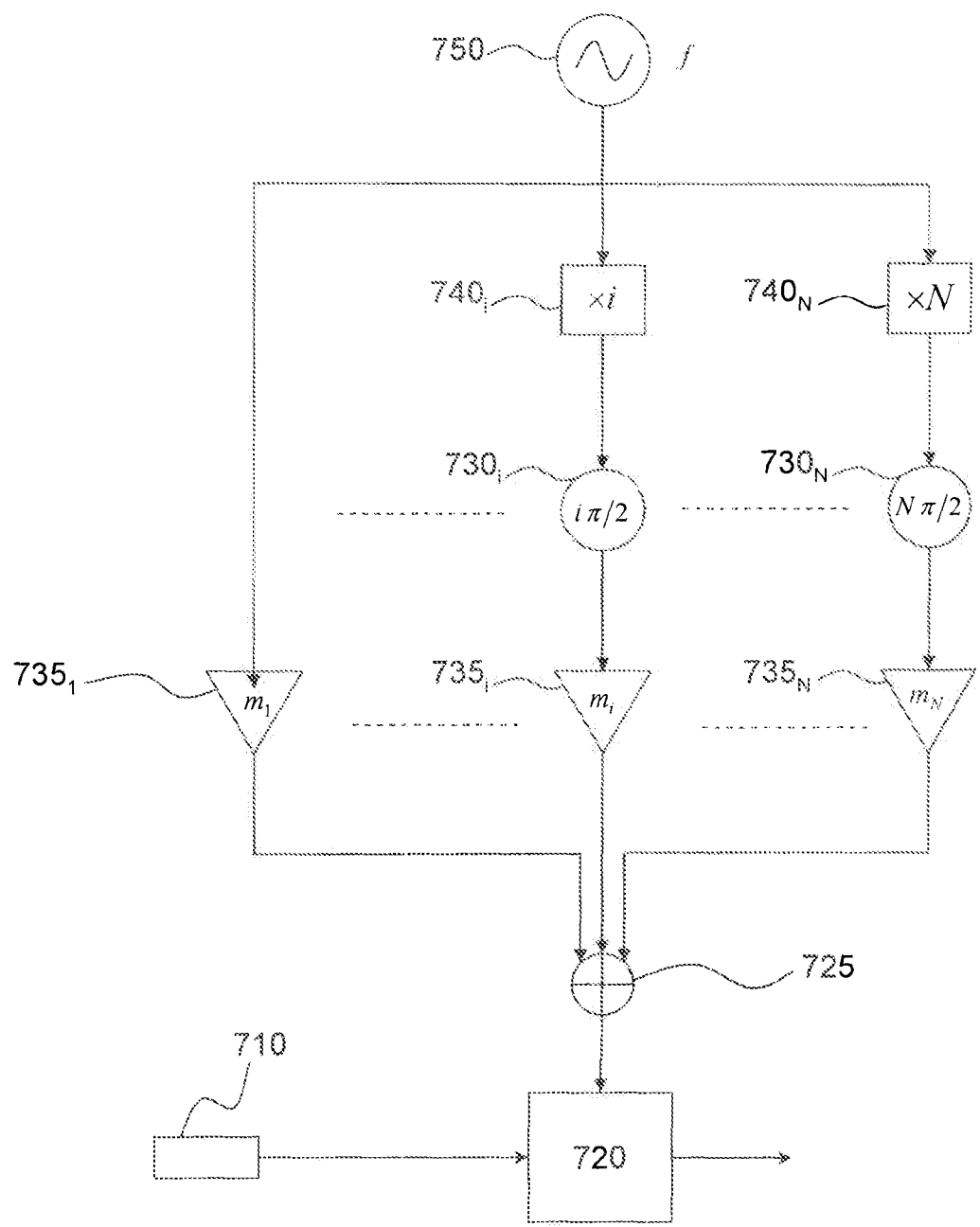
FIG. 7B illustrates a second exemplary phase modulation device applying the method for spreading a spectrum according to the invention.

FIG. 7B shows a second exemplary embodiment of a phase modulator for applying the method for spreading a spectrum according to the invention.

The elements identical with those of FIG. 7A bear the same reference symbols. Unlike the previous device, a single phase modulator 720 is used. This modulator receives as a modulation signal the electric signal resulting from the summing in 725 of the fundamental signal and of the suitably phase-shifted and amplified harmonic signals.

The invention claimed is:

1. A method for spreading a spectrum of a narrowband signal, comprising:
    phase-modulating the signal with a phase modulation signal including a plurality of sinusoidal components,
    the plurality of sinusoidal components comprising a component at a fundamental frequency and at least one component at a harmonic frequency of the fundamental frequency, and
    the plurality of sinusoidal components being synchronous and having phases respectively equal to successive multiples of $\pi/2$.

2. The spectrum spreading method according to claim 1, wherein the phase modulation signal includes the component at the fundamental frequency and a component at a frequency which is double the fundamental frequency, the component at the fundamental frequency being of an amplitude substantially equal to 1.2 and the component at the double frequency being of an amplitude substantially equal to 5.9, the phase of the component at the double frequency being shifted by $\pm\pi/2$ relative to that of the component at the fundamental frequency.

3. The spectrum spreading method according to claim 1, wherein the phase modulation signal includes the component at the fundamental frequency and a component at a frequency which is triple the fundamental frequency, both components being of a same amplitude substantially equal to $0.45\pi$, the phase of the component at the triple frequency being shifted by $\pm\pi/2$ relative to that of the component at the fundamental frequency.

4. The spectrum spreading method according to claim 1, wherein the phase modulation signal includes the component at the fundamental frequency, a component at a double frequency, and a component at a triple frequency of this frequency, the amplitude of the component at the fundamental frequency being substantially equal to 1.4, the amplitude of the component at the double frequency being between 2 and 20, and the amplitude of the component at the triple frequency being substantially equal to 0.4, the phases of the components at the double and triple frequency being shifted by $\pm\pi/2$ and $\pi$ respectively, relative to that of the fundamental component.

5. The spectrum spreading method according to claim 1, wherein the narrowband signal is an optical wave.

6. The spectrum spreading method according to claim 2, wherein the narrowband signal is an optical wave.

7. The spectrum spreading method according to claim 3, wherein the narrowband signal is an optical wave.

8. The spectrum spreading method according to claim 4, wherein the narrowband signal is an optical wave.

9. The spectrum spreading method according to claim 1, wherein the narrowband signal is a radiofrequency carrier.

10. The spectrum spreading method according to claim 2, wherein the narrowband signal is a radiofrequency carrier.

11. The spectrum spreading method according to claim 3, wherein the narrowband signal is a radiofrequency carrier.

12. The spectrum spreading method according to claim 4, wherein the narrowband signal is a radiofrequency carrier.

13. The spectrum spreading method according to claim 1, wherein the narrowband signal is successively phase-modulated by the plurality of sinusoidal components of the modulation signal.

14. The spectrum spreading method according to claim 2, wherein the narrowband signal is successively phase-modulated by the plurality of sinusoidal components of the modulation signal.

15. The spectrum spreading method according to claim 3, wherein the narrowband signal is successively phase-modulated by the plurality of sinusoidal components of the modulation signal.

16. The spectrum spreading method according to claim 4, wherein the narrowband signal is successively phase-modulated by the plurality of sinusoidal components of the modulation signal.

* * * * *